UNITED STATES PATENT OFFICE.

JAMES TIMMONS McKIM, OF REMINGTON, INDIANA.

IMPROVEMENT IN COMPOSITIONS FOR PRESERVING EGGS.

Specification forming part of Letters Patent No. 116,976, dated July 11, 1871.

*To all whom it may concern:*

Be it known that I, JAMES TIMMONS McKIM, of Remington, in the county of Jasper and State of Indiana, have invented a new and Improved Composition for Preserving Eggs; and I do hereby declare the following to be a full, clear, and exact description of the same.

This composition consists of the following ingredients: Water, 2,560 parts, weighing 160 pounds; quicklime, 148 parts, weighing 8 pounds; common salt, 96 parts, weighing 6 pounds; magnesia, 1.5 parts, weighing $1\frac{1}{2}$ ounce; saltpeter, 8 parts, weighing 8 ounces; glue, 2 parts, weighing 2 ounces; gum arabic, 1 part, weighing 1 ounce; alcoholic solution of gum shellac, 1.5 parts, weighing $1\frac{1}{2}$ ounce; tartrate of antimony, crystallized, 1 part, weighing 1 ounce. Whole number of parts, 2,819, weighing 174 pounds 15 ounces.

To prepare the composition for use, dissolve the tartrate of antimony in water and add the gum-shellac solution; slake the lime in cold water, add the salt and gum arabic, and stir twelve hours, then add to this mixture the antimony, gum-shellac compound, and also the the magnesia, the glue dissolved in warm water, and the saltpeter pulverized.

This composition drives off carbonic acid from the shell, and destroys all the animal matter contained therein, leaving the shell almost pure lime, and thereby preventing the putrefaction of the white and yelk. The composition also dormanizes the white and yelk. It also increases the thickness of the shell so much as to prevent all communication through it of any and all contaminating influences.

Having thus described my invention, what I claim as new, and desire to secure by Letters Patent, is—

The composition for preserving eggs herein specified.

The above specification of my invention signed by me this 22d day of May, A. D. 1871.

JAMES TIMMONS McKIM.

Witnesses:
  D. H. BATES,
  O. B. McINTIRE.